United States Patent
Pickering et al.

(10) Patent No.: US 12,008,678 B2
(45) Date of Patent: Jun. 11, 2024

(54) DISCRETE OPTIMISATION

(71) Applicant: KALIBRATE TECHNOLOGIES LIMITED, Manchester (GB)

(72) Inventors: Benjamin Pickering, Manchester (GB); Gareth Owen, Manchester (GB); David Leedal, Manchester (GB); Mark Pearce, Manchester (GB); Rebecca Wilson, Manchester (GB)

(73) Assignee: Kalibrate Technologies Limited, Manchester (GB)

( * ) Notice: Subject to any disclaimer, the term of this patent is extended or adjusted under 35 U.S.C. 154(b) by 24 days.

(21) Appl. No.: 17/785,836

(22) PCT Filed: Dec. 15, 2020

(86) PCT No.: PCT/GB2020/053217
§ 371 (c)(1),
(2) Date: Jun. 15, 2022

(87) PCT Pub. No.: WO2021/123751
PCT Pub. Date: Jun. 24, 2021

(65) Prior Publication Data
US 2023/0064834 A1 Mar. 2, 2023

(30) Foreign Application Priority Data
Dec. 18, 2019 (GB) .................................. 1918733

(51) Int. Cl.
*G06T 1/00* (2006.01)
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
None
See application file for complete search history.

(56) References Cited

U.S. PATENT DOCUMENTS

| 8,364,519 | B1 | 1/2013 | Basu et al. |
| 9,747,618 | B1 | 8/2017 | Reiss |
| 2003/0220772 | A1 | 11/2003 | Chiang et al. |
| 2015/0039663 | A1 | 2/2015 | Chiang et al. |

(Continued)

OTHER PUBLICATIONS

Boehning, et al., "A parallel integer linear programming algorithm," European Journal of Operational Research, vol. 34, No. 3, Mar. 1988 (pp. 393-398).

(Continued)

*Primary Examiner* — Martin Mushambo
(74) *Attorney, Agent, or Firm* — Michael Best & Friedrich LLP

(57) ABSTRACT

There is provided a method of discrete optimisation comprising: receiving an optimisation objective function; performing a continuous optimisation based upon the optimisation objective function to generate an initial continuous value; generating a plurality of candidate discrete values based upon the initial continuous value; evaluating the plurality of candidate discrete values based upon the optimisation objective function, wherein the evaluation of the plurality of candidate discrete values is carried out in parallel; and outputting a candidate discrete value based upon the evaluation.

11 Claims, 5 Drawing Sheets

(56) References Cited

U.S. PATENT DOCUMENTS

| | | |
|---|---|---|
| 2016/0147712 A1 | 5/2016 | Chiang et al. |
| 2017/0031664 A1 | 2/2017 | Yanagisawa |
| 2020/0210876 A1* | 7/2020 | Rolfe .................... G06N 3/044 |
| 2021/0174408 A1* | 6/2021 | Usui ..................... G06F 18/23 |
| 2022/0215504 A1* | 7/2022 | Moens ................... G06T 7/70 |

OTHER PUBLICATIONS

Guzelsoy, et al., "Restrict-and-relax search for 0-1 mixed-integer programs," Euro Journal On Computational Optimization, vol. 1, No. 1-2, Jan. 31, 2013 (pp. 201-218).

Ralphs, et al., "Parallel Solvers for Mixed Integer Linear Optimization," Cor@l Technical Report 16T-014-R3, Dec. 30, 2016 (49 pages).

International Search Report and Written Opinion for Application No. PCT/GB2020/053217 dated Apr. 8, 2021 (10 pages).

Search Report issued from the United Kingdom Patent Office for related Application No. GB1918733.5 dated Jun. 9, 2020 (3 Pages).

* cited by examiner

DISCRETE OPTIMISATION

TECHNICAL FIELD

This specification relates to systems and methods for performing discrete optimisation.

BACKGROUND

In general, optimization is the problem of determining the best value for one or more variables given a particular objective function. The objective function may comprise one or more constraints on the possible values of the variables being optimized. The variables may be continuous, such as a real number, or may be discrete, such as an integer or decimal-valued number having a particular number of significant digits.

It is possible to treat a discrete optimization problem as a continuous optimisation problem and then to round the optimal continuous value to a nearest discrete value. However, the rounded discrete value is not guaranteed to be the optimal discrete value and it is also possible that the rounded discrete value may violate the constraints of the objective function. In the second case, ad-hoc rules may be constructed to handle the violation of constraints. However such rules are also non-optimal and likely to be non-transferrable between different optimization problems.

Alternatively, the discrete optimization may be solved by evaluating all possible combinations of feasible discrete values. However, this type of brute-force approach quickly becomes computationally infeasible as the number of variables increases such that it is impossible to run efficiently even on parallel processing systems.

It is desired to provide a method of discrete optimisation that runs efficiently and in real-time (sub-second performance) that provides an optimal or near-optimal discrete solution.

SUMMARY

According to a first aspect, there is provided a method of discrete optimisation comprising: receiving an optimisation objective function; performing a continuous optimisation based upon the optimisation objective function to generate an initial continuous value; generating a plurality of candidate discrete values based upon the initial continuous value; evaluating the plurality of candidate discrete values based upon the optimisation objective function, wherein the evaluation of the plurality of candidate discrete values is carried out in parallel; and outputting a candidate discrete value based upon the evaluation.

Thus, initially the optimisation problem is treated as a continuous optimisation which is able to quickly determine an initial continuous solution. The initial continuous solution provides a good starting point from which a discrete optimisation can be performed. The continuous optimisation eliminates the need to search a large part of the discrete search space as it is unlikely that the optimal discrete value is in a space that is distant from the continuous solution. This greatly reduces the size of the search space for the discrete optimization and enables the discrete optimization to be feasibly performed in a parallel processing system such as a GPU or distributed system. By performing the discrete optimisation on a parallel processing system, the discrete optimisation can be performed efficiently and in real-time. In this way, the method is particularly adapted for implementation in a parallel processing system.

It will be appreciated that the initial continuous value and the plurality of candidate discrete values are not limited to single values and that the initial continuous value and the plurality of candidate discrete values may each comprise a plurality of values if there are a plurality of variables to be determined by the optimisation. In this regard, a value may be in the form of a vector of values.

The continuous optimisation may be carried out using existing known continuous optimisation methods as deemed appropriate by a person skilled in the art according to the optimisation problem being solved.

The method may further comprise determining that at least one of the plurality of candidate discrete values has an optimisation objective function value that is an improvement on the optimisation objective function value of the initial continuous value; and repeatedly performing the steps of generating and evaluating a plurality of candidate discrete values until it is determined that none of the plurality of candidate discrete values for a current iteration has an optimisation objective function value that is an improvement on a best optimisation objective function value of the previous iteration.

In this way, multiple iterations of searching may be performed to determine an optimal discrete value. In addition, if the initial continuous value was not a good estimate, the method is still able to determine an improved discrete value and is less likely to become trapped due to a poor initial estimate.

The plurality of candidate discrete values may be centred on the initial continuous value. The initial continuous value may be an n-dimensional vector and the plurality of candidate discrete values may be generated based upon the discrete values that lie within an n-dimensional hypercube centred on the initial continuous value. It will be appreciated that the phrase "centred on" need not mean the exact centre. For example, the centre point may be the nearest discrete value to the initial continuous value.

The n-dimensional hypercube may be arranged into a plurality of layers and the plurality of candidate discrete values may be generated based upon the discrete values lying within one or more layers. Each of the plurality of layers may be successively further away from the initial continuous value upon which the n-dimensional hypercube is centred. As such, where multiple iterations of searching are performed, the search space of discrete values is successively further away from the initial continuous value whilst still maintaining a feasibly sized search space.

The plurality of candidate discrete values may be generated based upon an index value of a respective layer. For example, the layer closest to the centre of the hypercube may have an index value of 1, the second closest layer an index value 2 and each successive layer having an incrementally larger index value. There may also exist a zeroth layer comprising the initial continuous value if the initial continuous value falls exactly on a discrete value.

The plurality of candidate discrete values may comprise the discrete values in a layer that fulfil the following condition:

$$\max(\lceil |k_1-p_1| \rceil, \lceil |k_2-p_2| \rceil, \ldots, \lceil |k_n-p_n| \rceil) = i$$

where $i$ is the $i^{th}$ layer of the hypercube, $p=(p_1, p_2, \ldots, p_n)$ is the initial continuous value as an n-dimensional vector, $k \in \mathbb{N}_0^n$ is the set of all possible (n-dimensional) discrete values, $\lceil \cdot \rceil$ is the ceiling function, and $|\cdot|$ is the absolute value.

It will be appreciated that discrete values that fulfil the above condition but violate any constraints of the objective function may be excluded from the plurality of candidate discrete values.

Outputting a candidate discrete value based upon the evaluation may comprise outputting the candidate discrete value having the best optimisation objective function value. It will be appreciated that the consideration of what constitutes the "best" candidate discrete value is dependent on the problem being solved and can be readily determined by a person skilled in the art. For example, in some cases the "best" value may be an objective function value having a highest value or alternatively, in other cases, the "best" value may be an objective function value having a lowest value. In another example, the "best" value may be objective function value that is closest to a target value.

Evaluating the plurality of candidate discrete values may be carried out using a graphics processing unit (GPU) or distributed computing system. The continuous optimisation to generate an initial continuous value may be performed by a CPU. Generating a plurality of candidate discrete values may also be performed by the CPU. A data transfer may be performed to transfer the initial continuous value and the plurality of candidate discrete values to the GPU for evaluation in parallel. Alternatively, the initial continuous values and the plurality of candidate discrete values may be transferred to the distributed computing system for evaluation in parallel. The GPU or distributed computing system may allocate processing units to each of the plurality candidate discrete values for processing. The evaluation data may be transferred from the GPU or distributed computing system back to the CPU for outputting a candidate discrete value.

The provided discrete optimisation method may be applied to any appropriate discrete optimisation problem. For example, resource scheduling such as allocating time units of a processor; determining parameters of a control process such as an assembly line, robot, self-driving vehicle; determining optimal paths, such as through a computer network or transportation network; data compression, such as quantization; forecasting such as optimising the price of a number of products according a to demand model; and other appropriate applications. For scheduling of processor time, the optimisation objective function may be to minimise the time required for a processor to perform a set of jobs with constraints based upon job priority, memory availability and time starvation. For data compression, the objective function may be to minimise the size of the compressed data with constraints based upon acceptable levels of data recoverability and a number of quantization levels. In another example, the application may be for fuel pricing, and the optimisation objective function may be to maximise the total profit or volume of all fuel products sold at a single fuel station. Constraints may include restrictions on the prices of the products, which may relate to cost (e.g. a minimum profit margin) or the prices of similar products at competing stations.

According to another aspect, there is provided a system comprising: a plurality of processing units, wherein each processing unit is coupled to a memory; wherein the plurality of processing units are configured to carry out a method according to the above method aspect. The plurality of processing units may comprise a plurality of processing units of a GPU.

According to a further aspect, there is provided a computer readable medium comprising stored instructions that when executed by a plurality of processing units causes the plurality of processing units to carry out a method according to the above method aspect.

Aspects can be combined and it will be readily appreciated that features described in the context of one aspect can be combined with other aspects.

It will be appreciated that aspects can be implemented in any convenient form. For example, aspect may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs.

BRIEF DESCRIPTION OF THE FIGURES

Embodiments will now be described, by way of example, with reference to the accompanying drawings, in which.

DETAILED DESCRIPTION

Figure 1:
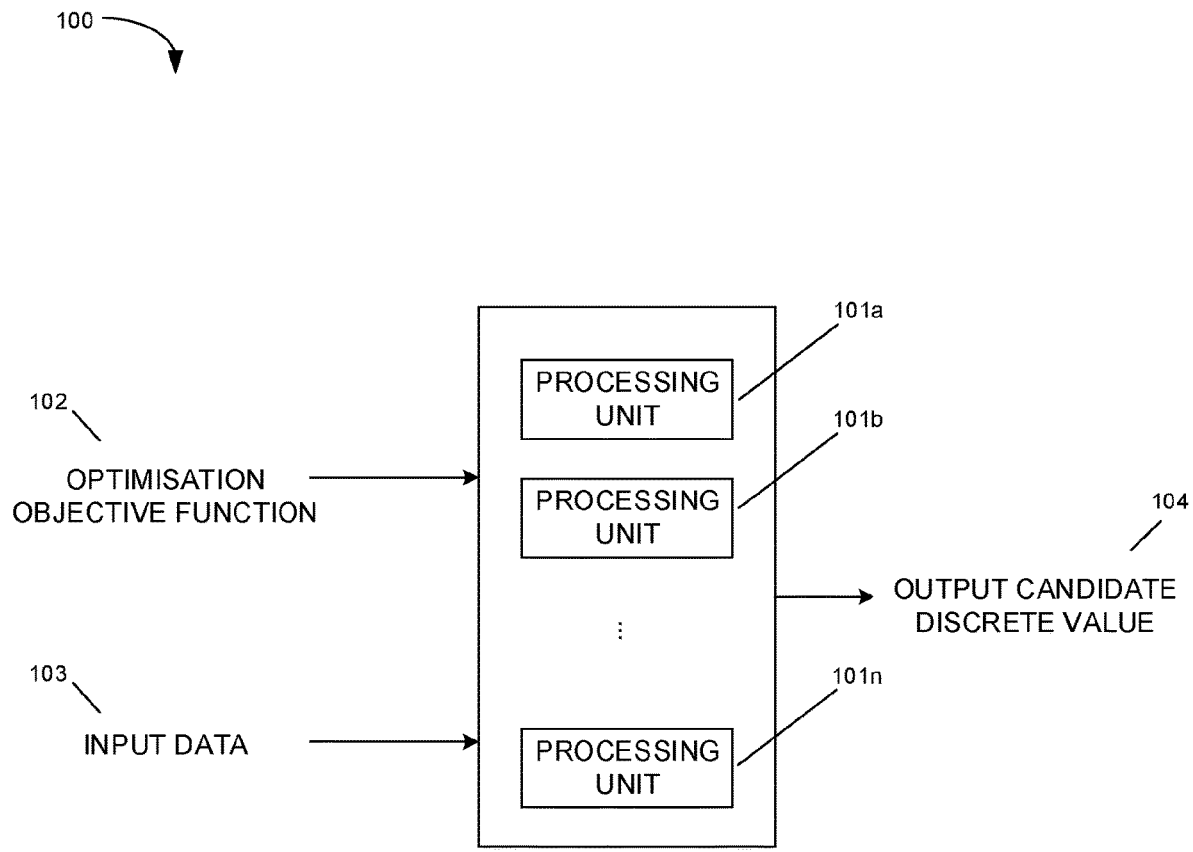
FIG. 1 is a schematic illustration of a system for performing discrete optimisation.

Referring now to FIG. 1, a system 100 comprises a plurality of processing units 101$a$ . . . n. The system 100 may be a distributed system in which some or all of the plurality of processing units 101$a$ . . . n are located within different physical devices. Alternatively, the plurality of processing units 101$a$ . . . n may be located within the same physical device such as a graphics processing unit (GPU). The plurality of processing units 101$a$ . . . n are coupled to a memory (not shown in FIG. 1). The memory may be a memory shared between all or some of the plurality of processing units 101$a$ . . . n or each processing unit of the plurality of processing units 101$a$ . . . n may have exclusive access to its own dedicated memory or the memory may be a combination of shared and dedicated memory.

The system 100 is arranged to receive an optimisation objective function 102 for a discrete optimisation problem. The optimisation objective function 102 may comprise one or more constraints and the objective of the discrete optimisation problem may be to determine the optimum discrete values that satisfy the one or more constraints. The system 100 may also receive data 103 if the discrete optimisation problem requires data on which the optimisation is to be carried out on.

The system 100 is further arranged to perform a continuous optimisation based upon 35 the optimisation objective function 102 to generate an initial continuous value. In this way, a large part of the discrete search space may be initially discounted and a good starting point from which to perform a feasibly sized discrete optimisation may be determined. The continuous optimisation may be based upon any suitable continuous optimisation technique for the problem at hand as deemed appropriate by a person skilled in the art. For example, the continuous optimisation technique may be based upon Sequential Least Squares Quadratic Programming (SLSQP); Method of Moving Asymptotes (MMA);

Limited-memory BFGS (L-BGFS) algorithm or other appropriate technique. The continuous optimisation may be performed by one, some, or all of the plurality of processing units 101a . . . n depending on the implementation of the continuous optimisation technique being employed. For example, the continuous optimisation technique may be performed by a CPU whilst a discrete optimisation (as described below) may be performed by a GPU.

The system 100 is arranged to generate a plurality of candidate discrete values based upon the initial continuous value. For example, the plurality of candidate discrete values may be centred on the initial continuous value generated from the continuous optimisation. Further details with respect to the generation of a plurality of candidate discrete values are provided below with reference to FIG. 4. As noted above, it will be appreciated that the initial continuous value and the plurality of candidate discrete values are not limited to single values and may comprise a plurality of values if there are a plurality of variables to be determined by the optimisation. In this regard, a value may be in the form of a vector of values.

The system 100 is further arranged to evaluate the plurality of candidate discrete values based upon the optimisation objective function 102. The evaluation of the plurality of candidate discrete values is carried out in parallel. For example, each of the plurality of processing units 101a . . . n may be allocated a subset of the plurality candidate discrete values to evaluate and the evaluation is performed in parallel across the plurality of processing units 101a . . . n. In this way, the evaluation of candidate discrete values may be carried out efficiently and in real-time. The number of candidate discrete values may be generated may be based upon the number of processing units.

The evaluation may be performed by determining an objective function value for the respective candidate discrete value according to the optimisation objective function 102. For example, the objective function value may be indicative of how well the candidate discrete value satisfies the constraints of the optimisation objective function 102. The system 100 is arranged to output a candidate discrete value 104 based upon the evaluation. For example, the candidate discrete value having the best objective function value may be output. It will be appreciated that the consideration of what constitutes the "best" candidate discrete value is dependent on the problem being solved and can be readily determined by a person skilled in the art. For example, in some cases the "best" value may be an objective function value having a highest value or alternatively, in other cases, the "best" value may be an objective function value having a lowest value. In another example, the "best" value may be objective function value that is closest to a target value.

The system 100 may be further arranged to carry out multiple rounds or iterations of generating and evaluating a plurality of candidate discrete values. For example, the system 100 may carry out a further iteration if the objective function value for at least one of the plurality of candidate discrete values of the current iteration is an improvement on the best objective function value for the previous iteration. When the objective function value ceases to improve, the process may be halted and the best candidate discrete value may be output by the system 100. Further details are provided with reference to FIG. 3 below.

Figure 1A:
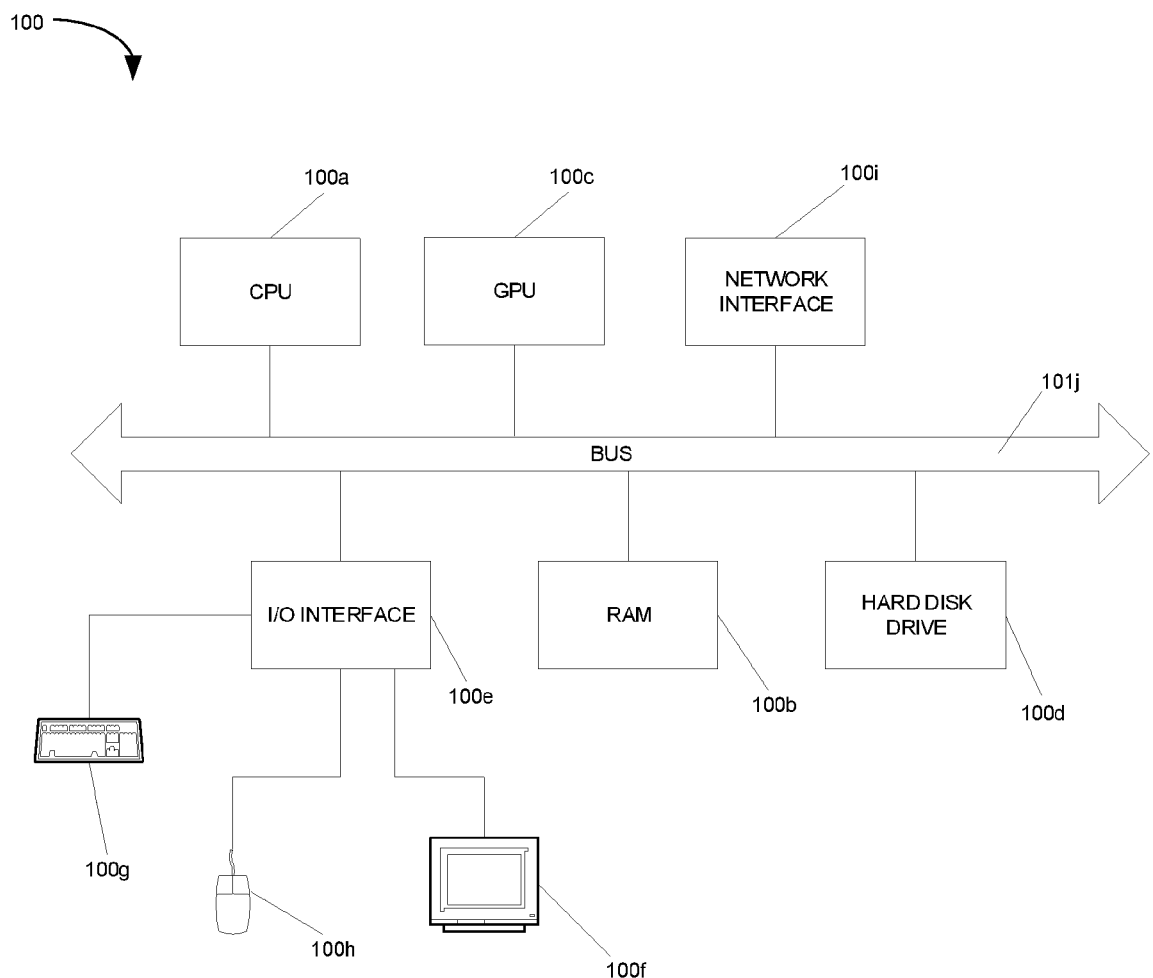
FIG. 1A is a schematic illustration of the system of FIG. 1 in more detail.

FIG. 1A shows the system 100 of FIG. 1 in more detail. The system 100 takes the form of a computer 100 in which the plurality of processing units 101a . . . n may be housed within. It can be seen that the computer 100 comprises a CPU 100a which is configured to read and execute instructions stored in a volatile memory 100b which takes the form of a random access memory. The volatile memory 100b stores instructions for execution by the CPU 100a and data used by those instructions. For example, in use, instructions for performing the continuous optimisation may be stored in volatile memory 100b.

The computer 100 further comprises a graphics processing unit (GPU) 100c that is configured to perform numerical processing operations in addition to graphics display operations. The GPU 100c comprises a plurality of processing units and either alone, or in combination with the CPU 100a, comprises the plurality of processing units 101a . . . n of FIG. 1. The GPU 100c may also comprise its own dedicated memory separate from the RAM 100b.

The computer 100 further comprises non-volatile storage in the form of a hard disc drive 100d. The computer 100 further comprises an I/O interface 100e to which are connected peripheral devices used in connection with the computer 100. More particularly, a display 100f is configured so as to display output from the computer 100. The display 100f may, for example, display the output candidate discrete value 104. Input devices are also connected to the I/O interface 100e. Such input devices include a keyboard 100g and a mouse 100h which allow interaction with the computer 100. Other input devices may also include gesture-based input devices. A network interface 100i allows the computer 100 to be connected to an appropriate computer network so as to receive and transmit data from and to other computing devices. The CPU 100a, volatile memory 100b, GPU 100c, hard disc drive 100d, I/O interface 100e, and network interface 100i, are connected together by a bus 100j.

Alternatively, the system 100 may be a distributed system comprising a network of servers housing one or more processing units which may include one or more GPUs. The general architecture of a server of the distributed system may be similar to the computer 100 of FIG. 1A.

Figure 2:
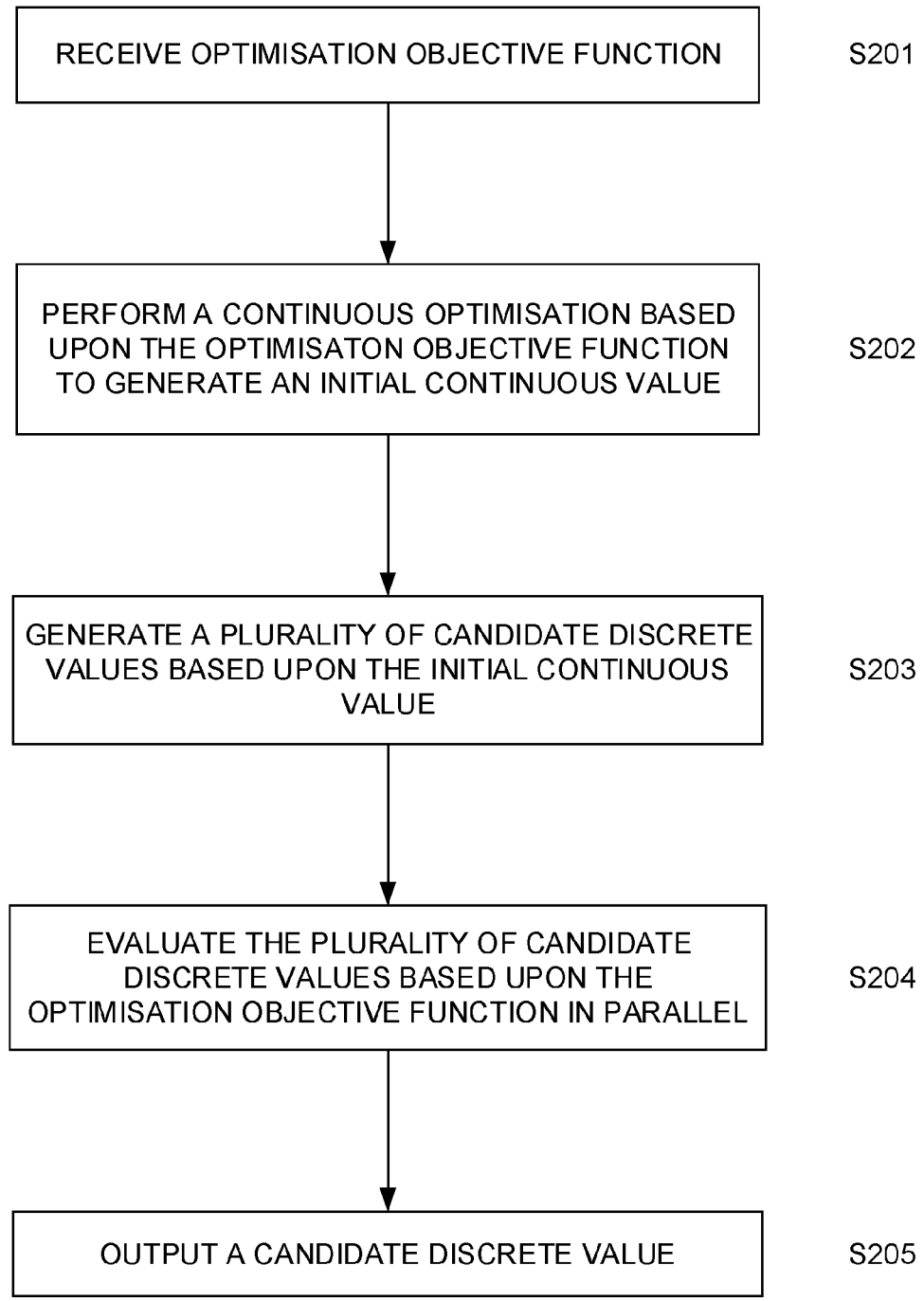
FIG. 2 is a flowchart showing exemplary processing for performing discrete optimisation.

Referring now to FIG. 2, exemplary processing for carrying out a discrete optimisation will now be described. It will be appreciated that the processing may be implemented using the system 100 of FIG. 1.

At step S201, an optimisation objective function 102 is received. As described above, the optimisation objective function 102 may comprise one or more constraints and the objective of the discrete optimisation problem may be to determine the optimum discrete values that satisfy the one or more constraints.

If the discrete optimisation problem requires data for the optimisation to be carried out on, the data may also be received prior to proceeding to step S202.

At step S202, a continuous optimisation is performed based upon the received optimisation objective function to generate an initial continuous value. As noted above, the continuous optimisation may be based upon any suitable continuous optimisation 35 technique for the problem at hand as deemed appropriate by a person skilled in the art.

At step S203, a plurality of candidate discrete values based upon the optimisation objective function are generated based upon the initial continuous value. For example, the plurality of candidate discrete values may be centred on the initial continuous value generated from the continuous optimisation. Generating a plurality of candidate discrete values is discussed in more detail below with reference to FIG. 4.

At step S204, the plurality of candidate discrete values are evaluated based upon the optimisation objective function 102, the evaluation being carried out in parallel by a plurality of processing units 101a . . . n. As discussed above, the evaluation may be performed by determining an objective function value for the candidate discrete value according to the optimisation objective function 102.

At step S205, a candidate discrete value is output based upon the evaluation. For example, the candidate discrete value having a best optimisation objective function value may be output.

Figure 3:
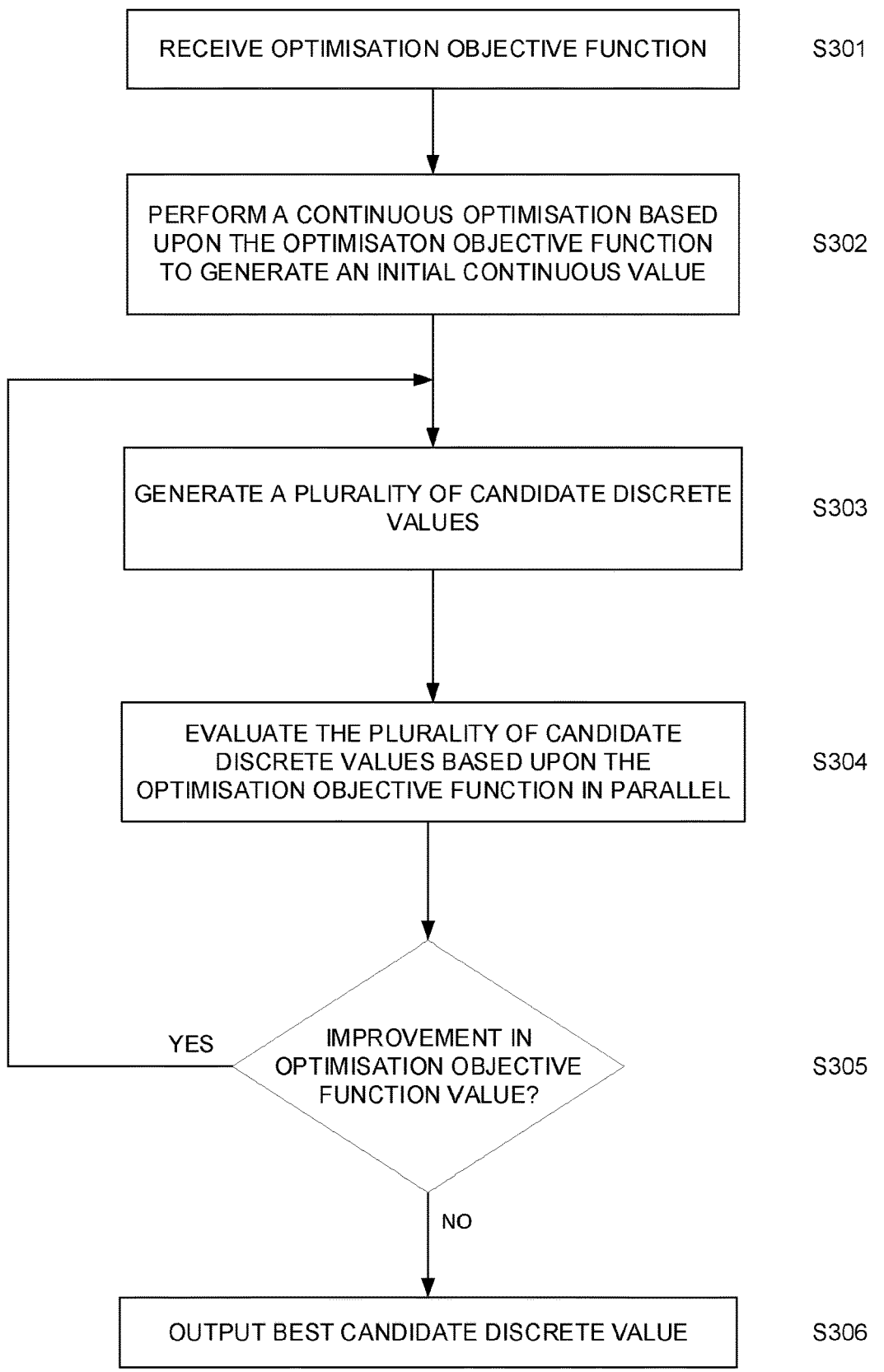
FIG. 3 is a flowchart showing further exemplary processing for performing discrete optimisation.

Referring now to FIG. 3, further exemplary processing for carrying out a discrete optimisation will now be described. It will be appreciated that the processing may be implemented using the system 100 of FIG. 1.

Steps S301 and S302 are identical to steps S201 and S202 above and comprise receiving an optimisation objective function 102 and performing a continuous optimisation based upon the optimisation objective function 102 to generate an initial continuous value respectively.

As discussed above, it is possible that multiple iterations of processing are carried out to determine an optimal discrete value. Thus, the steps of generating a plurality of candidate discrete values and evaluating the plurality of candidate discrete values may 30 be performed repeatedly until there is no further improvement in the optimisation objective value. More formally, in a similar manner to steps S203 and S204 above, at step S303, a plurality of candidate discrete values are generated and at step S304, the plurality of candidate discrete values are evaluated based upon the optimisation objective function 102. A corresponding objective function value is computed for each candidate discrete value.

At step S305, it is determined whether at least one of the plurality of candidate discrete values has an optimisation objective function value that is an improvement on the best optimisation objective function value of the previous iteration. For the first iteration, the continuous optimisation may be considered as the previous iteration and the optimisation objective function value corresponding to the initial continuous value may be used in the comparison as the best optimisation objective function value of the previous iteration. If an improvement in the optimisation objective function value in the current iteration is determined, then processing returns to step S303 and a further iteration is carried out. A second plurality of candidate discrete values are generated and evaluated and a further check is carried out to determine whether the optimisation is continuing to provide improved discrete values.

If there is no improvement in the optimisation objective function value, then no further iterations are performed and processing continues to step S306 where the candidate discrete value having the best optimisation objective function value is output. Alternatively, the iterative processing may cease based upon a different stopping criterion. For example, the iterative processing may be stopped when a specified number of iterations have been carried out or if the improvement is less than a specified threshold.

Figure 4:
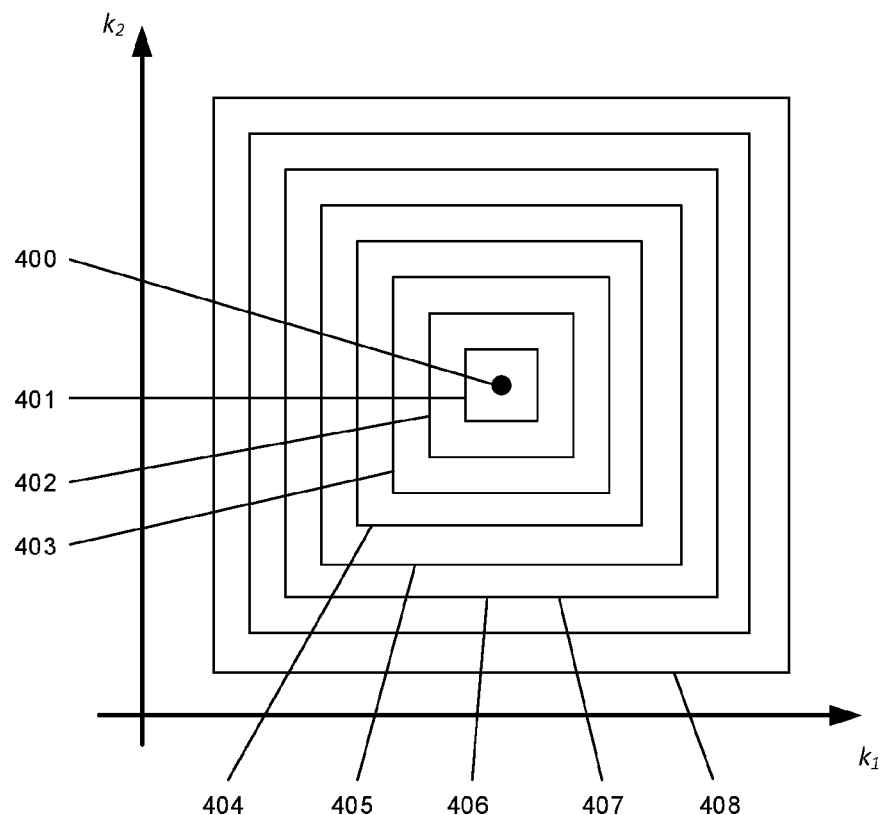
FIG. 4 is a schematic illustration of generating a plurality of candidate discrete values.

Referring now to FIG. 4, generation of a plurality of candidate discrete values will now be described in further detail. As noted above, the plurality of candidate discrete values may be centred on the initial continuous value. For example, the initial continuous value and the candidate discrete values may be n-dimensional vectors. The plurality of candidate discrete values may be generated based upon the discrete values that lie within an n-dimensional hypercube centred on the initial continuous value.

The n-dimensional hypercube may be further arranged into a plurality of layers as shown in FIG. 4. For clarity, the drawing of FIG. 4 is in two dimensions. As such, the hypercube depicted in FIG. 4 is a square. However, it will be appreciated that the optimisation may be performed in higher dimensions and is not limited to two dimensions. FIG. 4 depicts a square having 8 layers 401-408 centred on the initial continuous value 400. It will be appreciated that the hypercube is not limited to 8 layers and that the hypercube may have any number of layers as deemed appropriate by a person skilled in the art.

The plurality of candidate discrete values may be generated based upon the discrete values lying within one or more layers. The candidate discrete values may be generated based upon an index value of a respective layer. For example, the plurality of candidate discrete values may be the set of discrete values that satisfies the following condition:

$$\max(\lceil |k_1-p_1| \rceil, \lceil |k_2-p_2| \rceil, \ldots, \lceil |k_n-p_n| \rceil)=i$$

where $i$ is the $i^{th}$ layer of the hypercube, $p=(p_1, p_2, \ldots, p_n)$ is the initial continuous value 400 as an n-dimensional vector, $k \in \mathbb{N}_0^n$ is the set of all possible (n-dimensional) discrete values, $\lceil \cdot \rceil$ is the ceiling function, and $|\cdot|$ is the absolute value. In this way, all possible discrete values are allocated to a particular hypercube layer $i$ and the plurality of candidate discrete values may be generated from the discrete values belonging to one or more layers.

For example, where multiple iterations of generating and evaluating a plurality of candidate discrete values are carried out, a first iteration may operate on the discrete values corresponding to the first four layers 401-404, a second iteration may operate on the discrete values corresponding to the next two layers 405-406, and a third iteration may operate on the discrete values corresponding to the next single layer 407. In this regard, each successive iteration may evaluate candidate discrete values that are successively further away from the initial continuous value 400 whilst still maintaining a feasibly sized search space. Thus, if the initial continuous value was not a good estimate, the method is still able to determine a more optimal discrete value and is less likely to become trapped due to a poor initial estimate.

It will be appreciated that where the initial continuous value 400 falls exactly on a discrete point, that discrete point may be considered as being part of a zeroth layer where $i=0$. The zeroth layer may be considered for generating candidate discrete values. Where the initial continuous value 400 does not fall exactly on a discrete point, the zeroth layer will be empty and will not contain any discrete points from which to generate candidate discrete values.

The generation of candidate discrete values may comprise selecting all of the discrete values within specified layers of the hypercube as candidate discrete values or may alternatively be a random selection or weighted selection of the discrete values within the specified layers. It will also be appreciated that where the optimisation objective function 102 specifies one or more constraints, those discrete values that violate the one or more constraints may be excluded from selection. The number of layers specified or the number of candidate discrete values may be based upon the number of processing units available or the size of a memory coupled to the processing units for carrying out the evaluation of candidate discrete values.

Although specific embodiments have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

The invention claimed is:

1. A computer-implemented method of discrete optimisation comprising:
receiving an optimisation objective function;
performing a continuous optimisation based upon the optimisation objective function to generate an initial continuous value;
generating a plurality of candidate discrete values based upon the initial continuous value and limiting a size of a search space by centering the plurality of candidate discrete values on the initial continuous value;
evaluating the plurality of candidate discrete values based upon the optimisation objective function, wherein the evaluation of the plurality of candidate discrete values is carried out in parallel; and
outputting a candidate discrete value based upon the evaluation.

2. The method of claim 1, further comprising:
determining that at least one of the plurality of candidate discrete values has an optimisation objective function value that is an improvement on the optimisation objective function value of the initial continuous value;
repeatedly performing the steps of generating and evaluating a plurality of candidate discrete values until it is determined that none of the plurality of candidate discrete values for a current iteration has an optimisation objective function value that is an improvement on a best optimisation objective function value of the previous iteration.

3. The method of claim 1, wherein the initial continuous value is an n-dimensional vector and the plurality of candidate discrete values are generated based upon the discrete values that lie within an n-dimensional hypercube centred on the initial continuous value.

4. The method of claim 3, wherein the n-dimensional hypercube is arranged into a plurality of layers and the plurality of candidate discrete values are generated based upon the discrete values lying within one or more layers.

5. The method of claim 4, wherein the plurality of candidate discrete values are generated based upon an index value of a respective layer.

6. The method of claim 5, wherein the plurality of candidate discrete values comprises the discrete values in a layer that fulfil the following condition:

$$\max(\lceil |k_1-p_1| \rceil, \lceil |k_2-p_2| \rceil, \ldots, \lceil |k_n-p_n| \rceil) = i$$

where i is the $i^{th}$ layer of the hypercube, $p=(p_1, p_2, \ldots, p_n)$ is the initial continuous value as an n-dimensional vector, $k \in \mathbb{N}_0^n$ is the set of all possible n-dimensional discrete values, $\lceil \cdot \rceil$ is the ceiling function, and $|\cdot|$ is the absolute value.

7. The method of claim 1, wherein outputting a candidate discrete value based upon the evaluation comprises outputting the candidate discrete value having the best optimisation objective function value.

8. The method of claim 1, wherein evaluating the plurality of candidate discrete values is carried out using a graphics processing unit or distributed computing system.

9. A system comprising:
a plurality of processing units, wherein each processing unit is coupled to a memory; and
wherein the plurality of processing units are configured to carry out a method according to claim 1.

10. The system of claim 9, wherein the plurality of processing units comprise a plurality of processing units of a GPU.

11. A non-transitory computer readable storage medium comprising stored instructions that when executed by a plurality of processing units causes the plurality of processing units to carry out a method according to claim 1.

* * * * *